US010936624B2

(12) United States Patent
Kruempelmann et al.

(10) Patent No.: US 10,936,624 B2
(45) Date of Patent: Mar. 2, 2021

(54) DEVELOPMENT AND PRODUCTIVE USE OF SYSTEM WITH PARALLEL USE OF PRODUCTION DATA AND ZERO DOWNTIME OF SOFTWARE CHANGES

(71) Applicant: SAP SE, Walldorf (DE)

(72) Inventors: Wulf Kruempelmann, Altlussheim (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 389 days.

(21) Appl. No.: 16/005,927

(22) Filed: Jun. 12, 2018

(65) Prior Publication Data

US 2019/0377820 A1  Dec. 12, 2019

(51) Int. Cl.
*G06F 7/00* (2006.01)
*G06F 16/27* (2019.01)
*G06F 8/70* (2018.01)
*G06F 16/11* (2019.01)
*G06F 16/21* (2019.01)

(52) U.S. Cl.
CPC ........... *G06F 16/27* (2019.01); *G06F 8/70* (2013.01); *G06F 16/113* (2019.01); *G06F 16/211* (2019.01)

(58) Field of Classification Search
CPC ...... G06F 16/27; G06F 16/211; G06F 16/113; G06F 8/70; G06F 16/2282; G06F 16/2453; G06F 16/2455; G06F 8/65; G06F 11/1464; G06F 21/6218; H04L 67/10; H04L 67/2819; H04L 67/1097; H04L 67/1004; H04L 67/1095; H04L 67/32

See application file for complete search history.

(56) References Cited

U.S. PATENT DOCUMENTS

| | | | |
|---|---|---|---|
| 7,191,160 B2 | 3/2007 | Hoeft et al. |
| 7,302,678 B2 | 11/2007 | Bohlmann et al. |
| 7,325,233 B2 | 1/2008 | Kuck et al. |
| 7,392,236 B2 | 6/2008 | Rusch et al. |
| 7,421,437 B2 | 9/2008 | Hoeft et al. |
| 7,457,828 B2 | 11/2008 | Wenner et al. |
| 7,461,097 B2 | 12/2008 | Stahl et al. |
| 7,480,681 B2 | 1/2009 | Fecht et al. |
| 7,490,102 B2 | 2/2009 | Ivanova et al. |

(Continued)

OTHER PUBLICATIONS

U.S. Appl. No. 14/960,983, filed Dec. 7, 2015, Eberlein, et al.

(Continued)

*Primary Examiner* — Azam M Cheema
(74) *Attorney, Agent, or Firm* — Fish & Richardson P.C.

(57) ABSTRACT

Methods, systems, and computer-readable storage media for replicating, within a database server, an access schema to provide a clone access schema, during production use of the single system, the access schema providing access to a data schema storing production data, and a configuration schema storing configuration data, providing, within the database server, a clone local repository, a test data schema, and a clone configuration schema, the clone access schema accessing at least a portion of the production data within the data schema through a test union view, and test data within the test data schema through the test union view, and after completion of the test use, switching production use of the system to the clone access schema, the clone configuration schema, and the clone local repository.

20 Claims, 7 Drawing Sheets

(56) References Cited

U.S. PATENT DOCUMENTS

| | | |
|---|---|---|
| 7,519,614 B2 | 4/2009 | Glania et al. |
| 7,523,142 B2 | 4/2009 | Driesen et al. |
| 7,565,443 B2 | 7/2009 | Rossmanith et al. |
| 7,571,164 B2 | 8/2009 | Kuersch et al. |
| 7,587,705 B2 | 9/2009 | Benjes et al. |
| 7,631,303 B2 | 12/2009 | Debertin et al. |
| 7,634,771 B2 | 12/2009 | Benjes et al. |
| 7,647,251 B2 | 1/2010 | Baeuerle et al. |
| 7,650,597 B2 | 1/2010 | Bohlmann et al. |
| 7,657,575 B2 | 2/2010 | Eberlein et al. |
| 7,669,181 B2 | 2/2010 | Benjes et al. |
| 7,702,696 B2 | 4/2010 | Ziegler et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,774,319 B2 | 8/2010 | Schweigkoffer et al. |
| 7,788,319 B2 | 8/2010 | Schmidt et al. |
| 7,797,708 B2 | 9/2010 | Weber et al. |
| 7,844,659 B2 | 11/2010 | Baeuerle et al. |
| 7,894,602 B2 | 2/2011 | Mueller et al. |
| 7,934,219 B2 | 4/2011 | Baeuerle et al. |
| 7,962,920 B2 | 6/2011 | Gabriel et al. |
| 7,971,209 B2 | 6/2011 | Eberlein et al. |
| 8,005,779 B2 | 8/2011 | Baeuerle et al. |
| 8,108,433 B2 | 1/2012 | Baeuerle et al. |
| 8,108,434 B2 | 1/2012 | Schlarb et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,315,988 B2 | 11/2012 | Glania et al. |
| 8,356,010 B2 | 1/2013 | Driesen |
| 8,356,056 B2 | 1/2013 | Schlarb et al. |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,413,150 B2 | 4/2013 | Lu et al. |
| 8,429,668 B2 | 4/2013 | Kowalkiewicz et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,484,167 B2 | 7/2013 | Glania et al. |
| 8,489,640 B2 | 7/2013 | Schlarb et al. |
| 8,504,980 B1 | 8/2013 | Kraft et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,612,927 B2 | 12/2013 | Brunswig et al. |
| 8,645,483 B2 | 2/2014 | Odenheimer et al. |
| 8,683,436 B2 | 3/2014 | Baeuerle et al. |
| 8,694,557 B2 | 4/2014 | Thimmel et al. |
| 8,706,772 B2 | 4/2014 | Hartig et al. |
| 8,719,826 B2 | 5/2014 | Baeuerle et al. |
| 8,751,437 B2 | 6/2014 | Teichmann et al. |
| 8,751,573 B2 | 6/2014 | Said et al. |
| 8,762,408 B2 | 6/2014 | Brand et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,819,075 B2 | 8/2014 | Schlarb et al. |
| 8,856,727 B2 | 10/2014 | Schlarb et al. |
| 8,863,005 B2 | 10/2014 | Lehr et al. |
| 8,863,097 B2 | 10/2014 | Thimmel et al. |
| 8,868,582 B2 | 10/2014 | Fitzer et al. |
| 8,880,486 B2 | 11/2014 | Driesen et al. |
| 8,886,596 B2 | 11/2014 | Effern et al. |
| 8,892,667 B2 | 11/2014 | Brunswig et al. |
| 8,924,384 B2 | 12/2014 | Driesen et al. |
| 8,924,565 B2 | 12/2014 | Lehr et al. |
| 8,938,645 B2 | 1/2015 | Schlarb et al. |
| 8,949,789 B2 | 2/2015 | Schlarb et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,009,708 B2 | 4/2015 | Lu et al. |
| 9,020,881 B2 | 4/2015 | Ritter et al. |
| 9,021,392 B2 | 4/2015 | Baeuerle et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,038,021 B2 | 5/2015 | Schlarb et al. |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,176,801 B2 | 11/2015 | Baeuerle et al. |
| 9,182,979 B2 | 11/2015 | Odenheimer et al. |
| 9,182,994 B2 | 11/2015 | Schlarb et al. |
| 9,183,540 B2 | 11/2015 | Eberlein et al. |
| 9,189,226 B2 | 11/2015 | Driesen et al. |
| 9,189,520 B2 | 11/2015 | May et al. |
| 9,223,985 B2 | 12/2015 | Eberlein et al. |
| 9,229,707 B2 | 1/2016 | Borissov et al. |
| 9,244,697 B2 | 1/2016 | Schlarb et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,354,948 B2 | 5/2016 | Baeuerle et al. |
| 9,275,120 B2 | 6/2016 | Mayer et al. |
| 9,361,407 B2 | 6/2016 | Hutzel et al. |
| 9,378,233 B2 | 6/2016 | Lee et al. |
| 9,430,523 B2 | 8/2016 | Falter et al. |
| 9,442,977 B2 | 9/2016 | Falter et al. |
| 9,501,541 B2 | 11/2016 | Doering et al. |
| 9,507,810 B2 | 11/2016 | Baeuerle et al. |
| 9,513,811 B2 | 12/2016 | Wein et al. |
| 9,575,819 B2 | 2/2017 | Baeuerle et al. |
| 9,613,068 B2 | 4/2017 | Tsirogiannis et al. |
| 9,619,552 B2 | 4/2017 | Falter et al. |
| 9,639,567 B2 | 5/2017 | Lee et al. |
| 9,639,572 B2 | 5/2017 | Hutzel et al. |
| 9,724,757 B2 | 8/2017 | Barrett |
| 2005/0052150 A1 | 3/2005 | Bender |
| 2006/0248507 A1 | 11/2006 | Benjes et al. |
| 2006/0248545 A1 | 11/2006 | Benjes et al. |
| 2008/0120129 A1 | 5/2008 | Seubert et al. |
| 2010/0070336 A1 | 3/2010 | Koegler et al. |
| 2010/0153341 A1 | 6/2010 | Driesen et al. |
| 2010/0161648 A1 | 6/2010 | Eberlein et al. |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0101650 A1 | 4/2014 | Buzaski et al. |
| 2014/0108440 A1 | 4/2014 | Nos |
| 2014/0164963 A1 | 6/2014 | Klemenz et al. |
| 2014/0324917 A1 | 10/2014 | Haas et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0046413 A1 | 2/2015 | Mihnea et al. |
| 2015/0100546 A1 | 4/2015 | Eberlein et al. |
| 2015/0178332 A1 | 6/2015 | Said et al. |
| 2015/0347410 A1 | 12/2015 | Kim et al. |
| 2015/0363434 A1 | 12/2015 | Cerasaro et al. |
| 2016/0085777 A1* | 3/2016 | Engelko ............ G06F 16/211 |
| | | 707/803 |
| 2016/0239523 A1 | 8/2016 | Haferkorn et al. |

(56) References Cited

U.S. PATENT DOCUMENTS

2016/0246832 A1    8/2016  Eberlein et al.
2017/0025441 A1    1/2017  Mori
2017/0116220 A1*   4/2017  Wong .................. G06F 11/1471

OTHER PUBLICATIONS

U.S. Appl. No. 15/083,918, filed Mar. 29, 2016, Eberlein, et al.
U.S. Appl. No. 13/087,677, filed Mar. 31, 2016, Eberlein, et al.
U.S. Appl. No. 15/285,715, filed Oct. 5, 2016, Specht et al.
U.S. Appl. No. 15/593,830, filed May 12, 2017, Eberlein, et al.

* cited by examiner

DEVELOPMENT AND PRODUCTIVE USE OF SYSTEM WITH PARALLEL USE OF PRODUCTION DATA AND ZERO DOWNTIME OF SOFTWARE CHANGES

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases.

Software can be developed in a multi-environment landscape (system) that can include, for example, a development system, a test system, and a production system. In some examples, an application is created and/or edited (e.g., configured) using the development system, and is tested using the test system. If the result of the test(s) is satisfactory, the application (or new configuration) can be loaded into the production system for use by users in a live setting. Each of the systems can be provided as a tenant in a multi-tenant architecture, and changes from one tenant can be transported to another tenant. For example, changes implemented in the development system are transported to the test system, and from the test system, to the production system. This process, however, is cost intensive, in terms of technical resources, is complex, and time consuming.

SUMMARY

Implementations of the present disclosure include computer-implemented methods for development and production use within a single system. More particularly, implementations of the present disclosure enable parallel execution of development tasks and production tasks within a single system, as well as zero downtime for providing software changes within the single system. In some implementations, actions include replicating, within a database server, an access schema to provide a clone access schema, during production use of the single system, the access schema providing access to a data schema storing production data, and a configuration schema storing configuration data, providing, within the database server, a clone local repository, a test data schema, and a clone configuration schema, the clone access schema accessing at least a portion of the production data within the data schema through a test union view, and test data within the test data schema through the test union view, and after completion of the test use, switching production use of the system to the clone access schema, the clone configuration schema, and the clone local repository. Other implementations of this aspect include corresponding systems, apparatus, and computer programs, configured to perform the actions of the methods, encoded on computer storage devices.

These and other implementations can each optionally include one or more of the following features: actions further include, after completion of the test use, dropping the access schema, and the configuration schema from the database server; the test union view includes a read-only projection view to the data schema, and a read-/write- projection view to the test data schema; the test data schema stores one or more deltas based on an operation executed during the test use on at least a portion of the production data; a change includes a process change resulting in one or more changes to configuration data; a change includes a software change; and actions further include providing a cloned repository schema associated with a central repository storing shared data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for development and production use within a single system. More particularly, implementations of the present disclosure enable parallel execution of development tasks and production tasks within a single system, as well as zero downtime for providing software changes within the single system. In some implementations, actions include replicating, within a database server, an access schema to provide a clone access schema, during production use of the single system, the access schema providing access to a data schema storing production data, and a configuration schema storing configuration data, providing, within the database server, a clone local repository, a test data schema, and a clone configuration schema, the clone access schema accessing at least a portion of the production data within the data schema through a test union view, and test data within the test data schema through the test union view, and after completion of the test use, switching production use of the system to the clone access schema, the clone configuration schema, and the clone local repository.

Figure 1:
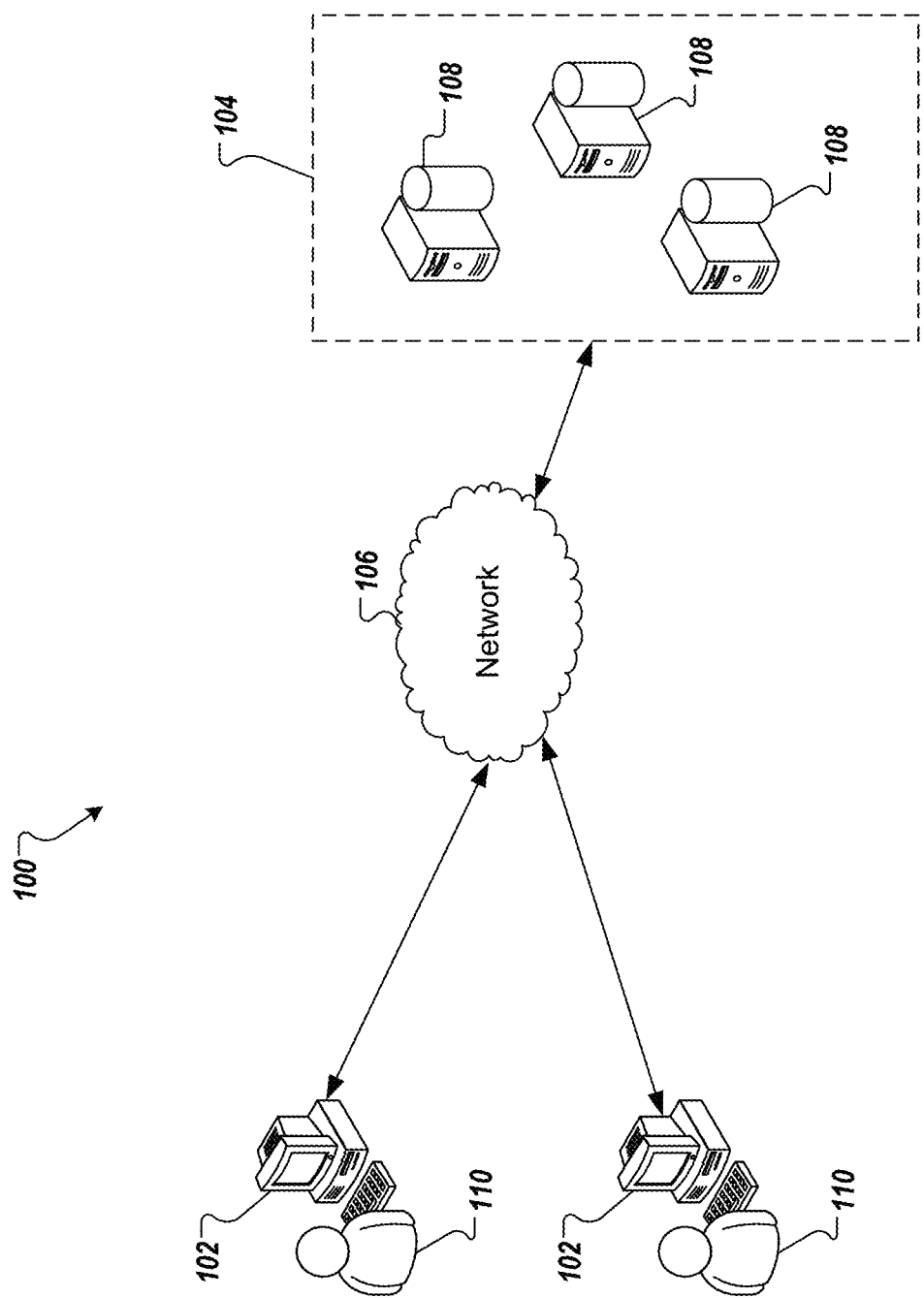
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)) over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications.

Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context.

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application, and/or a database. Example maintenance procedures can include an upgrade procedure, a patch procedure, a configuration procedure, and development and testing procedures. Implementations of the present disclosure will be described in further detail herein with reference to an upgrade procedure.

An example upgrade procedure can include updating software. For example, an application can be updated from a first version (e.g., V1) to a second version (e.g., V2). Example updates can include adding functionality to the application, and/or structural changes to one or more tables stored in one or more databases. As another example, a database can be updated from a first version (e.g., V1) to a second version (e.g., V2). Example updates can include updating a data schema of the database, which can involve structural changes to one or more tables. In some examples, a data schema (also referred to as database schema) is a data structure that defines how data is to be stored in the database. In some examples, the databases schema can be defined in a formal language that is supported by a database management system (DBMS). In general, a data schema can be described as a catalog that specifies all database objects that can be stored in the database. In some examples, different data schemas (e.g., V1 versus V2) can have different objects with the same object name, but different structures.

Traditionally, the upgrade procedure (e.g., from a start-release to a target release) is executed in a landscape that includes multiple environments used to create, and/or effect changes in one or more applications, and/or database systems. Example environments include a development environment (also referred to herein as a development system), a test environment (also referred to herein as a test system), and a production environment (also referred to herein as a production system). In some examples, each system includes respective software and/or hardware that enables developers to perform functionality during the upgrade procedure (e.g., edit a configuration of the software, test newly configured software, put newly configured software into production).

In such traditional arrangements, each of the systems can be provided as a tenant in a multi-tenant architecture, and changes from one tenant can be transported to another tenant. For example, changes implemented in the development system are transported to the test system, and from the test system, to the production system. This process, however, is cost intensive, in terms of technical resources, and is complex. For example, each system, as a respective tenant, consumes resources, such as memory (e.g., replication of terabytes of data across systems), and processors. Further, complexity arises in developing and deploying the transports between systems.

In view of the foregoing, and as described in further detail herein, implementations of the present disclosure provide data separation using respective schemas, and management of parallel activities on data as copies of the schema. More particularly, data within a database system is separated between a central repository, a local repository, data, and configuration data. Multiple views are implemented to enable execution, and management of parallel activities within the single system. Accordingly, implementations of the present disclosure enable parallel execution of development tasks and production tasks within a single system, as well as zero downtime for providing software changes within the single system.

Figure 2A:
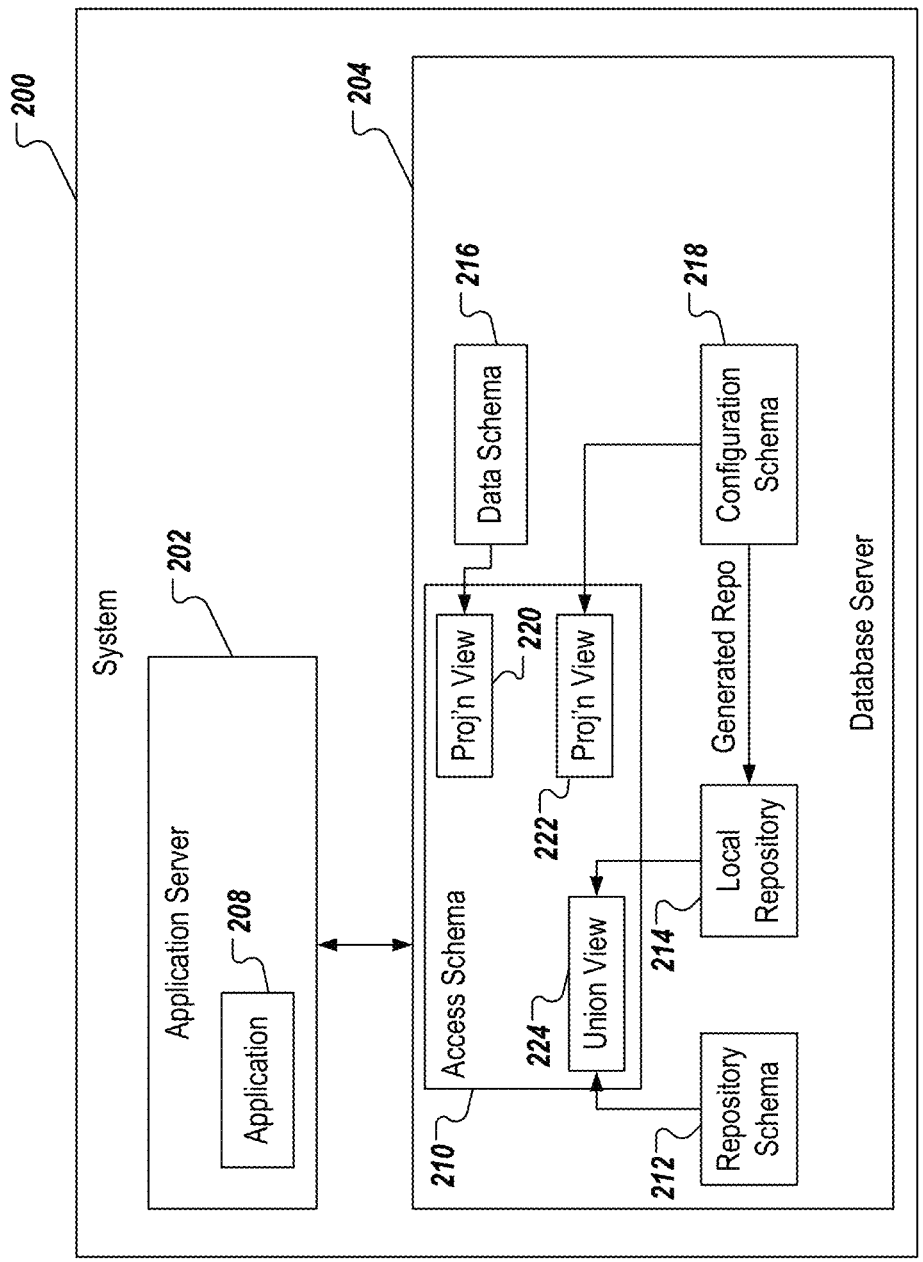
FIGS. 2A-2D depict an example customer system in accordance with implementations of the present disclosure.
Figure 2B:
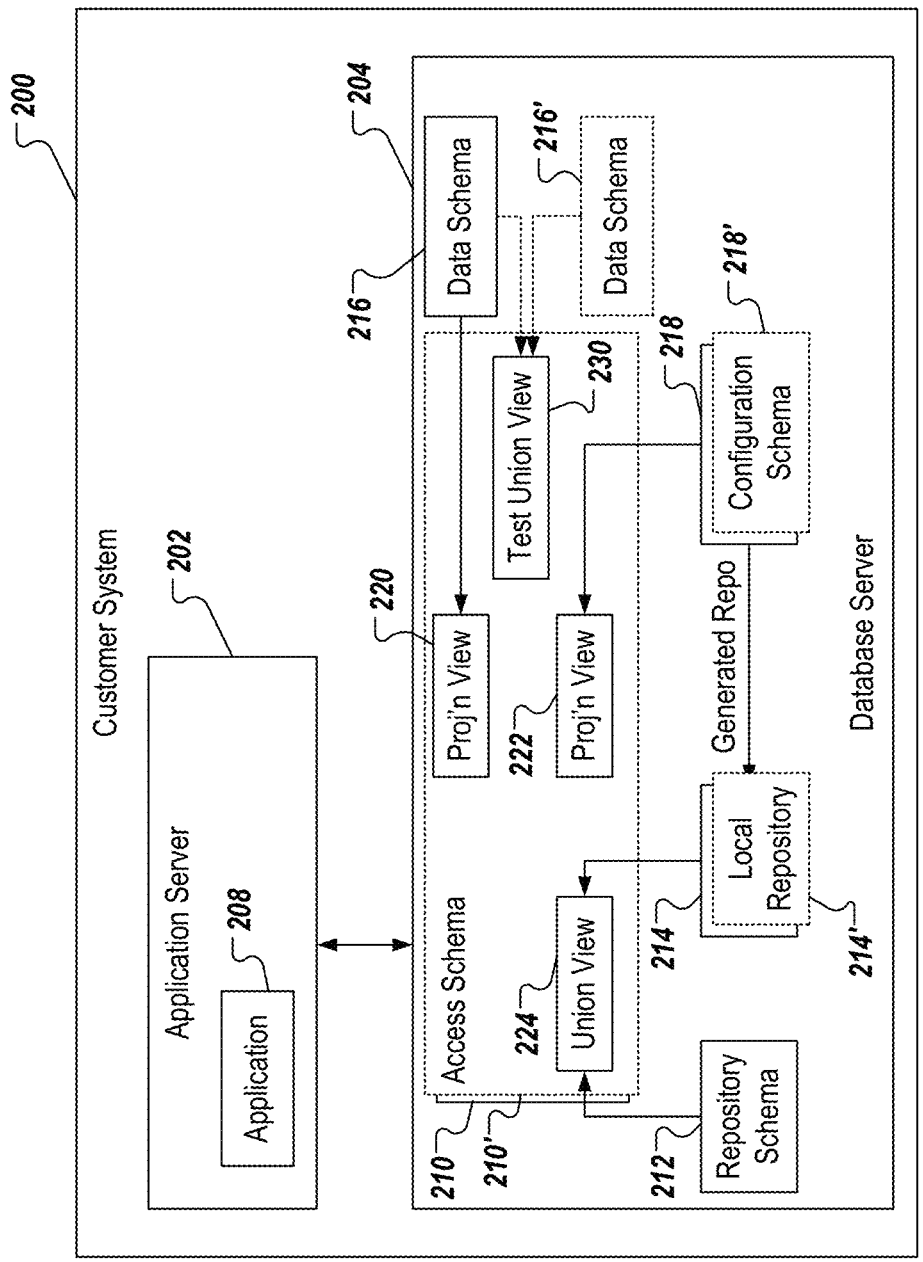
Figure 2C:
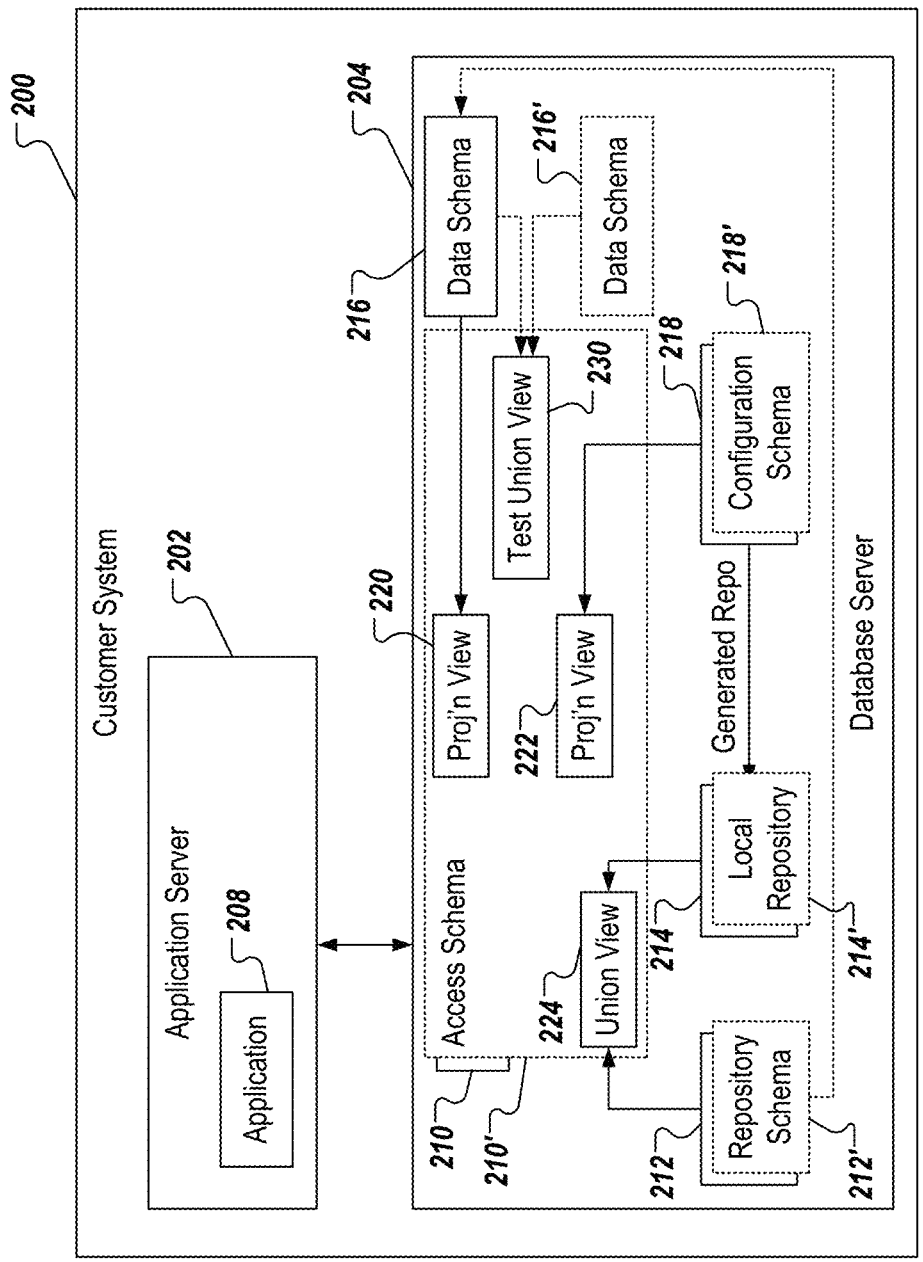
Figure 2D:
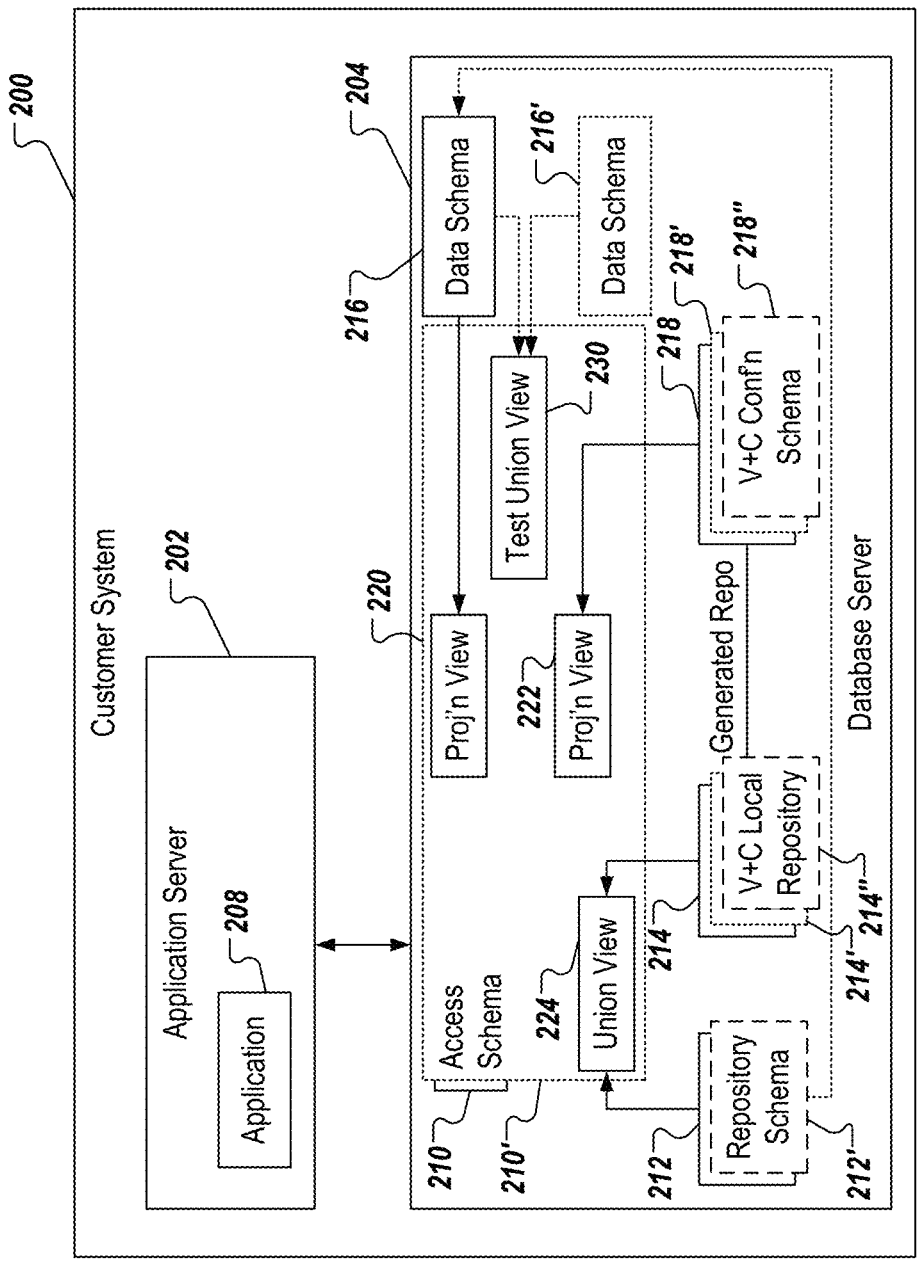

FIGS. 2A-2D depict an example system 200 in accordance with implementations of the present disclosure. More particularly, FIG. 2A depicts the example system 200 including data separation in accordance with implementations of the present disclosure. FIG. 2B depicts the example system 200 of FIG. 2A during a process change in accordance with implementations of the present disclosure. FIG. 2C depicts the example system 200 of FIG. 2A during a software change in accordance with implementations of the present disclosure. FIG. 2D depicts the example system 200 of FIG. 2A during a combined process change and software change in accordance with implementations of the present disclosure.

With particular reference to FIG. 2A, the system 200 includes an application server 204, and a database system 206. In some examples, the application server 204 executes an application 208 that interacts with data stored in the database server 204. In some examples, the application 208 can query the database server 204 to retrieve data. In some examples, the application 208 creates, modifies, and/or deletes data stored in the database server 204.

In accordance with implementations of the present disclosure, the database server includes an access schema 210, through which interactions between the application server 202, and the database server 204 are executed. In some examples, the access schema uses a database schema, which is a namespace in the database system 206. The access schema 210 contains views to the tables in the data schemas. In accordance with implementations of the present disclosure, and as described herein, another access schema can be built up in parallel to the access schema 210 showing a different set of tables, table content, and table structures. This can be established without breaking the access schema 210, which can remain operational. Once the new access schema and the data is prepared, usage is switched from the access schema 210 to the new access schema.

In some examples, views in the access schema 210 hide structure changes in the tables residing in the data schema. If a table needs to change content, another table is created in parallel to the first and the view in the new access schema can select from the new table. Union views can join customer and vendor data, and a new union view in a new access schema can join old customer data with new vendor data. In this manner, a data update is established by deploying a new vendor table in the data schema, creating a new union view in the new access schema and switching users to the new access schema. Different access schemas can thus provide a different view on the same set of data, and join it with new data.

In the example of FIG. 2A, the database server 204 includes a repository schema 212, a local repository 214, a data schema 216 (e.g., corresponding to terabytes of data), and a configuration schema 218. In some examples, the data schema 216 enables access to production data, and the configuration schema 218 enables access to configuration data. In some examples, production data includes data that an enterprise uses in its operations. Example data can include, without limitation, names, addresses, accounts, telephone numbers, tracking identifiers, product identifiers, and the like. In some examples, configuration data defines one or more processes corresponding to operations of the enterprise.

In some implementations, the repository schema 212 correspond to shared data that is in a central database. For example, if multiple enterprises access the example system (e.g., in a multi-tenant architecture), shared data is common among all enterprises, and is read from the central repository. The repository schema 212 can contain vendor software, configuration data, and/or default data. In some implementations, the local repository 214 includes enterprise-specific data.

In some implementations, the access schema 210 functions as a central schema, through which data in the database system 204 is accessed. In some examples, respective projection views 220, 222 are provided to link the access schema 210 to the data schema 216, and the configuration schema 218. In some examples, a projection view can be described as a particular type of view that hides fields of a single database table. In general, a projection view is used to suppress (mask) one or more fields in a database table (projection), thereby minimizing the number of interfaces. Because a projection view defines a set of fields being read, a change in the database table (e.g., adding fields) is not visible to the users of the projection view. In some examples, a union view 224 is provided, and links the access schema 210 to the repository schema 212, and the local repository 214. In some examples, a union view can be described as a particular type of view that combines results from multiple database tables. For example, a union view can provide access through one view to vendor and customer data, even if they are stored in different database tables.

In some examples, changes to configuration data can result in changes to the local repository (e.g., additions to one or more tables). This results in revised view definitions (e.g., for replacing, or updating the projection views 220, 222).

As described in further detail herein, implementations of the present disclosure enable process changes, software changes (e.g., upgrades), and combinations thereof to be performed in the example system 200 during production use of the example system 200.

With particular reference to FIG. 2B, process changes will be described. In some examples, a (business) process change is implemented through changes to configuration data. In some implementations, the access schema 210, the local repository 214, and the configuration schema 218 are cloned to provide a clone access schema 210', a clone local repository 214', and a clone configuration schema 218', respectively. A new configuration according to the changed process is developed, and written to the cloned repository, configuration schema, and can be tested against the production data in the data schema 214. The clone access schema 210' provides access to the new configuration, and the existing transactional data. A configuration change can result in new and/or modified entries of configuration tables, new and/or modified entries in a repository, and/or extended structures to tables in the data schema for transactional data.

In accordance with implementations of the present disclosure, the data schema 216 is linked as a read only projection view into a test union view 230, and a writable test data schema 216' is provided. In some implementations, the test union view 230 reads from the data schema 216, and uses the test data schema 216' as the write part of the data. The test union view 230 is used by the clone access schema 210' to perform development activities.

In some implementations, the test union view 230 is configured to avoid number clashes between the multiple tables (e.g., test table, production table). For example, if an application requires unique numbers, taking the same numbers for test as for production would result in duplicate entries, and taking numbers from the production for test would result in number gaps once the test data is deleted. In accordance with implementations of the present disclosure, numbers for test data are taken from a completely different and unused range than for production, which ensures no collision in the numbers, and no gaps once test data is deleted. In some examples, the test union view 230 is set-up by creating a read-only projection view from a table of the data schema 216 (e.g., a table TAB) with the name TAB#0, creating a local table with the same structure with the name /W/TAB, and providing a union view that combines both the table and projection view with the name TAB. In some examples, and to avoid name clashes between the tables, queries to an enqueue-server are sent to a unique enqueue-server working for all schemata within the example system 200. For number ranges controlled by the central number range algorithm, the table defining the number ranges is copied to the test data schema 216', and a lower bound of the number range in the test data schema 216' is set to an upper bound of the data in the data schema 216. If the upper value of the number range is the technical maximum, this is reduced by an amount (e.g., 10%), and the reduced value is provided as the lower limit in the test data schema 216'.

In accordance with implementations of the present disclosure, the process change is reflected in the configuration schema 218', and can be tested using the clone access schema 210', which has read-only access to production data of the data schema 216, and read-/write-access to test data of the test data schema 216' through the test union view 230. Concurrently, the application server 202 can still perform production operations through the access schema 210, as depicted in FIG. 2A. In this manner, production data can be used for testing within the system 200, without impacting concurrent production use of the production data. For example, edits to production data that occur during testing can be stored through the test data schema 216' (e.g., as deltas).

In some implementations, after the process changes have been implemented, and tested, the process changes can be released for production use. In some examples, the test data schema 216' is dropped, and the test union view 230 is deleted. In some examples, a new set of projection views are provided from the data schema 216 to the access schema 210'. That is, the projection views 220, 222 are respectively replaced with new projection views. Access to the database server 204 is through the clone access schema 210', and the previous access schema 210 can be dropped. Further, the clone local repository 214', and the clone configuration schema 218' remain, while the local repository 214, and the configuration schema 218 are dropped. In some examples, if the new configuration is discarded (e.g., test failed), the clone repository and clone schemas are dropped, and the original remain in use. In some implementations, any schema that is dropped can be archived for subsequent access, and/or review. In this manner, a history of revisions to the example system 200 can be maintained.

With particular reference to FIG. 2C, software changes will be described. In some implementations, the access schema 210, the local repository 214, and the configuration schema 218 are cloned to provide the clone access schema 210', the clone local repository 214', and the clone configuration schema 218', respectively, and as described above with reference to FIG. 2B. The data schema 216 is linked as a read only projection view into a test union view 230, and the writable test data schema 216' is provided. Further, the repository schema 212 is cloned to provide a clone repository schema 212'.

In some implementations, the software changes (e.g., upgrade to V2) are deployed to one or more of the clone components. For example, software changes are delivered to one or more of the clone access schema 210', the clone repository schema 212', the clone local repository 214', and the clone configuration schema 218'. In some examples, a revised configuration is provided, and is delivered to the clone configuration schema 218'. Accordingly, the software change is reflected in the clone components, and can be tested using the clone access schema 210', which has read-only access to production data of the data schema 216, and read-/write-access to test data of the test data schema 216' through the test union view 230. Concurrently, the application server 202 can still perform production operations through the access schema 210, as depicted in FIG. 2A, using the unchanged software (e.g., V1).

In some implementations, after the software change has been implemented, and tested, the software change can be released for production use. In some examples, the test data schema 216' is dropped, and the test union view 230 is deleted. In some examples, a new set of projection views are provided from the data schema 216 to the access schema 210'. That is, the projection views 220, 222 are respectively replaced with new projection views. In some examples, adaptation of the data tables can be done without changing the projection views 220, 222. For example, one or more fields can be added to the data tables without needing to change the projection views 220, 222. Access to the database server 204 is through the clone access schema 210', and the previous access schema 210 can be dropped.

With particular reference to FIG. 2D, an example combined process change and software change will be described. In some implementations, the access schema 210, the repository schema 212, the local repository 214, and the configuration schema 218 are cloned to provide the clone access schema 210', the clone repository 212', the clone local repository 214', and the clone configuration schema 218', respectively, and as described above with reference to FIGS. 2A and/or 2B. The data schema 216 is linked as a read only projection view into a test union view 230, and the writable test data schema 216' is provided.

In some implementations, a combined local repository 214", and a combined configuration schema 218" are provided. For example, the combined local repository 214" include enterprise-specific, and vendor-specific data (e.g., data provided by the vendor of the example system 200). For example, the combined configuration schema 218" include enterprise-specific, and vendor-specific configuration data (e.g., configuration data provided by the vendor of the example system 200). In some examples, if configuration data and repository data are modified, there is a schema for both data types. In the setup of the process, both schema 214 and 218 are copied to 214″ and 218″. The software upgrade will be performed both in 214′, 218′ as well as in 214″, 218″.

In some implementations, after the software change, and process change have been implemented, and tested, the software change and the process change can be released for production use. In some examples, the test data schema 216′ is dropped, and the test union view 230 is deleted. In some examples, a new set of projection views are provided from the data schema 216 to the access schema 210′. That is, the projection views 220, 222 are respectively replaced with new projection views. Access to the database server 204 is through the clone access schema 210′, and the previous access schema 210 can be dropped.

Figure 3:
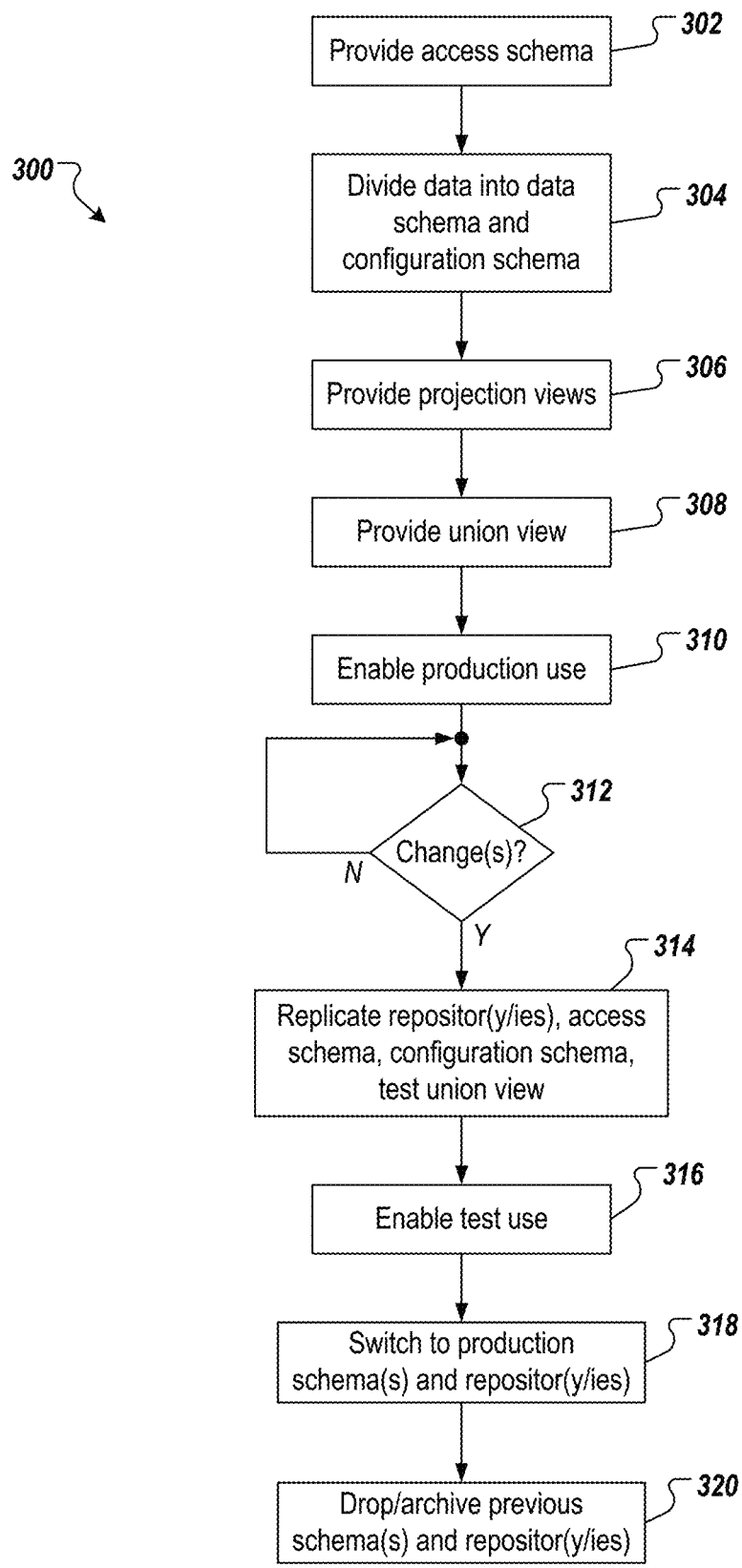
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. In some examples, the example process 300 is executed to implement changes (e.g., process, and/or software) in a single system (e.g., the system 200) during concurrent production use of the system.

An access schema is provided (302). For example, and with reference to FIG. 2A, in configuring an enterprise for use of the example system 200, an enterprise-specific, access schema 210 is provided within the database server 204. Data is divided into a data schema and a configuration schema (304). For example, and with reference to FIG. 2A, the data schema 216 is provided, through which production data is accessed, and the configuration schema 218 is provided, through which configuration data is accessed. Projection views are provided (306). For example, the projection view 220 is provided between the data schema 216, and the access schema 210, and the projection view 222 is provided between the configuration schema 218, and the access schema 210. A union view is provided (308). For example, the union view 224 is provided between the access schema 210, and the repository schema 212 and the local repository 214.

Production use is enabled (310). For example, production use of the system 200 is enabled by a provider (e.g., a vendor that hosts the system) enabling an agent of an enterprise (e.g., a customer) to access the system. In some examples, the agent interacts with the system 200 through the application 208 executing on the application server 202. In some examples, production use can include the agent accessing, and/or manipulating data stored within the database server 204. For example, the agent can issue commands through the application 208, which are at least partially executed within the database server 204 through the access schema 210 (e.g., the access schema 210 accesses data from the repository schema 212, and/or the local repository 214 through the union view; the access schema 210 accesses production data through the projection view 220; the access schema 210 accesses configuration data through the projection view 222).

It is determined whether one or more changes are to be made (312). For example, it can be determined whether a process change, and/or a software change are to be made. If no changes are made, the example process 300 can loop back for continued production sue. If changes are to be made, one or more repositories are replicated, the access schema is replicated, the configuration schema is replicated, and a test union view is provided (314). For example, the access schema 210, the local repository 214, and the configuration schema 218 are cloned to provide the clone access schema 210′, the clone local repository 214′, and the clone configuration schema 218′, respectively, and the test union view 230 is provided (e.g., see FIGS. 2B-2D).

Test use is enabled (318). For example, the agent (or a test user) can issue commands through the application 208, which are at least partially executed within the database server 204 through the clone access schema 210′ (e.g., the access schema 210′ accesses data from the repository schema 212 (or clone repository schema 212′), and/or the clone local repository 214′ through the union view 224; the clone access schema 210′ accesses production data through the test union view 230; the clone access schema 210′ accesses configuration data through the projection view 222). In accordance with implementations of the present disclosure, and as described herein, production use of the system 200 can continue, concurrent with the test use.

Production use is switched to schema(s) and repository (y/ies) (318). For example, upon completion of test use, and a decision to implement the changes to production, production use can switch from the access schema 210, the local repository 214, and the configuration schema 218, to the clone access schema 210′, the clone local repository 214′, and the clone configuration schema 218′ (e.g., and the projection views 220, 222 can be updated, if needed). Previous schema(s) and/or repository(y/ies) are dropped/archived (320). For example, the access schema 210, the local repository 214, and the configuration schema 218 are archived, and deleted from the database server 204.

Implementations of the present disclosure provide one or more of the following example advantages. In some examples, a single system is used for process changes, and/or software changes. This avoids the user of a multi-system landscape, and conserves technical resources (e.g., processors, and memory for each of the multiple systems). Although some data is replicated within the single system, this is significantly less than replication required for multiple systems (e.g., 90% less). Implementations of the present disclosure also enable production use of the single system during change/test procedures. Further, implementations of the present disclosure avoid transport procedures required in multi-system landscapes requirements. Instead, implementations copy schema, change schema access, and archive/drop schema.

Figure 4:
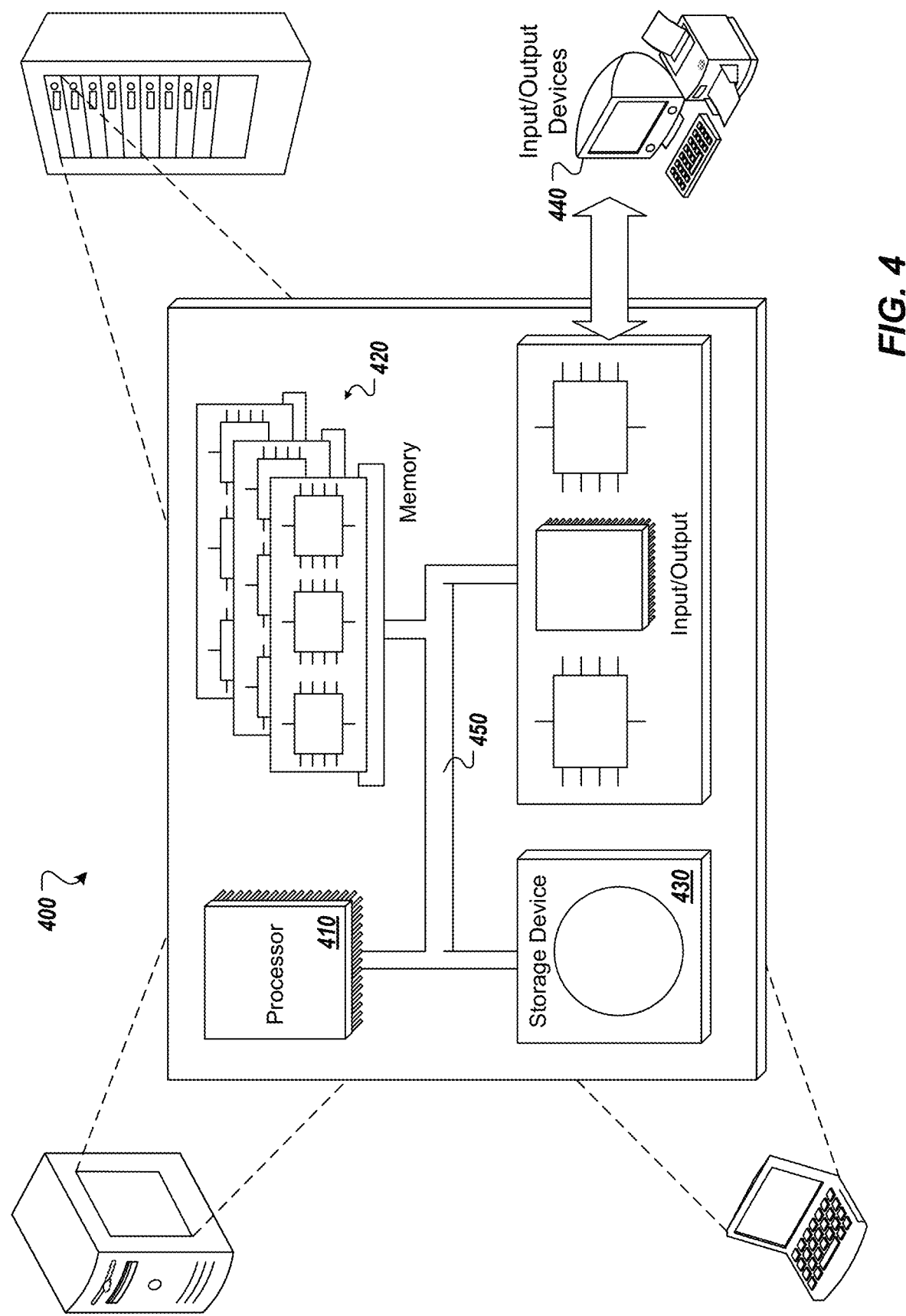
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for concurrent production use and test use within a single system comprising an application server, and a database server, the method being executed using one or more processors and comprising:
   replicating, during production use of the single system, an access schema within the database server to provide a clone access schema within the database server, the access schema providing access to a data schema storing production data, and a configuration schema storing configuration data;
   providing, within the database server, a clone local repository, a test data schema, and a clone configuration schema, the clone access schema comprising a test union view that provides access to the test data schema and production data in the data schema;
   during the test use:
      accessing at least a portion of the production data within the data schema through the test union view, and writing changes in production data as test data to the test data schema through the test union view, and accessing production data within the data schema through the access schema and writing changes in production data to the data schema; and
   after completion of the test use, switching production use of the system to the clone access schema, the clone configuration schema, and the clone local repository.

2. The method of claim 1, further comprising, after completion of the test use, dropping the access schema, and the configuration schema from the database server.

3. The method of claim 1, wherein the test union view comprises a read-only projection view to the data schema, and a read-/write-projection view to the test data schema.

4. The method of claim 1, wherein the test data schema stores one or more deltas based on an operation executed during the test use on at least a portion of the production data.

5. The method of claim 1, wherein the changes comprise a process change resulting in one or more changes to configuration data.

6. The method of claim 1, wherein the changes comprise a software change.

7. The method of claim 6, further comprising providing a cloned repository schema associated with a central repository storing shared data.

8. A non-transitory computer-readable storage medium coupled to one or more processors and having instructions stored thereon which, when executed by the one or more processors, cause the one or more processors to perform operations for concurrent production use and test use within a single system comprising an application server, and a database server, the operations comprising:
 replicating, during production use of the single system, an access schema within the database server to provide a clone access schema within the database server, the access schema providing access to a data schema storing production data, and a configuration schema storing configuration data;
 providing, within the database server, a clone local repository, a test data schema, and a clone configuration schema, the clone access schema comprising a test union view that provides access to the test data schema and production data in the data schema;
 during the test use:
  accessing at least a portion of the production data within the data schema through the test union view, and writing changes in production data as test data to the test data schema through the test union view, and
  accessing production data within the data schema through the access schema and writing changes in production data to the data schema; and
 after completion of the test use, switching production use of the system to the clone access schema, the clone configuration schema, and the clone local repository.

9. The computer-readable storage medium of claim 8, wherein operations further comprise, after completion of the test use, dropping the access schema, and the configuration schema from the database server.

10. The computer-readable storage medium of claim 8, wherein the test union view comprises a read-only projection view to the data schema, and a read-/write-projection view to the test data schema.

11. The computer-readable storage medium of claim 8, wherein the test data schema stores one or more deltas based on an operation executed during the test use on at least a portion of the production data.

12. The computer-readable storage medium of claim 8, wherein the changes comprise a process change resulting in one or more changes to configuration data.

13. The computer-readable storage medium of claim 8, wherein the changes comprise a software change.

14. The computer-readable storage medium of claim 13, wherein operations further comprise providing a cloned repository schema associated with a central repository storing shared data.

15. A system, comprising:
 a computing device; and
 a computer-readable storage device coupled to the computing device and having instructions stored thereon which, when executed by the computing device, cause the computing device to perform operations for concurrent production use and test use within a single system comprising an application server, and a database server, the operations comprising:
  replicating, during production use of the single system, an access schema within the database server to provide a clone access schema within the database server, the access schema providing access to a data schema storing production data, and a configuration schema storing configuration data;
  providing, within the database server, a clone local repository, a test data schema, and a clone configuration schema, the clone access schema comprising a test union view that provides access to the test data schema and production data in the data schema;
  during the test use:
 accessing at least a portion of the production data within the data schema through the test union view, and writing changes in production data as test data to the test data schema through the test union view, and
 accessing production data within the data schema through the access schema and writing changes in production data to the data schema; and
  after completion of the test use, switching production use of the system to the clone access schema, the clone configuration schema, and the clone local repository.

16. The system of claim 15, wherein operations further comprise, after completion of the test use, dropping the access schema, and the configuration schema from the database server.

17. The system of claim 15, wherein the test union view comprises a read-only projection view to the data schema, and a read-/write-projection view to the test data schema.

18. The system of claim 15, wherein the test data schema stores one or more deltas based on an operation executed during the test use on at least a portion of the production data.

19. The system of claim 15, wherein the changes comprise a process change resulting in one or more changes to configuration data.

20. The system of claim 15, wherein the changes comprise a software change.

* * * * *